United States Patent [19]

Mohnach et al.

[11] 3,940,068

[45] Feb. 24, 1976

[54] WINDSHIELD WIPER ARM WITH WATER DISTRIBUTION MEANS

[75] Inventors: Michael G. Mohnach, Merrillville; John J. Plisky, Munster, both of Ind.

[73] Assignee: The Anderson Company, Gary, Ind.

[22] Filed: Sept. 13, 1974

[21] Appl. No.: 505,743

[52] U.S. Cl............ 239/284 R; 239/567; 239/596; 239/600; 15/250.04
[51] Int. Cl.².......................... B05B 1/10; B60S 1/46
[58] Field of Search .......... 239/284, 289, 451, 456, 239/459, 460, 567, 596, 600; 15/250.01, 250.04

[56] References Cited
UNITED STATES PATENTS

| | | | |
|---|---|---|---|
| 3,058,141 | 10/1962 | Christen | 15/250.2 |
| 3,192,550 | 7/1965 | Ziegler | 15/250.04 |
| 3,296,647 | 1/1967 | Gumbleton | 15/250.04 |
| 3,423,025 | 1/1969 | Rodger | 239/284 |
| 3,428,992 | 2/1969 | DiGiorgio | 15/250.04 |
| 3,790,083 | 2/1974 | Redifer | 239/284 |
| 3,793,666 | 2/1974 | Wurth | 15/250.04 |
| 3,827,101 | 8/1974 | Wubbe | 15/250.04 |

*Primary Examiner*—Robert S. Ward, Jr.
*Attorney, Agent, or Firm*—Wegner, Stellman, McCord, Wiles & Wood

[57] ABSTRACT

A washer jet assembly is provided with a housing adapted to be suspended on a wiper arm and having an inlet sleeve communicating into a distribution chamber. A plurality of grooves are formed in the open end wall of the distribution chamber of the housing to form passageways from the distribution chamber to the outside. A cover button with a head portion and a shank portion is secured to the housing with the head portion closing the distribution chamber and with the shank portion passing through the distribution chamber and the housing and being secured to the housing by upsetting the exposed end of the shank portion.

3 Claims, 5 Drawing Figures

WINDSHIELD WIPER ARM WITH WATER DISTRIBUTION MEANS

BACKGROUND OF THE INVENTION

1. Field of the Invention

This invention relates to windshield washer equipment and more particularly to an arm mounted washer jet assembly for distributing washing fluid on the windshield at locations for maximum wiping efficiency.

2. Description of the Prior Art

Windshield washers used in automobiles and the like are generally well-known. Most are mounted in the hood portion and direct washing fluid from a small nozzle toward the windshield. The problems encountered by this form of washer are numerous. Often, fluid is wastefully applied to the windshield at locations not covered by the wiper or at locations already travelled by the wiper. As the distance from the hood nozzle to the windshield increases, accuracy of the directed fluid will decrease. Quite often the fluid does not reach the windshield at all because of the distance involved and the pressure directing the fluid from the jet onto the windshield is either too strong or too weak. In addition, strong wind creates havoc with this form of washer because the fluid is redirected to a location other than the one intended. A further result of the great distance between the washer jet and the windshield is the requirement of small jets which can easily become clogged with foreign matter.

On the other hand, arm-mounted washer jets are known, but they are mostly unsuccessful because of high production costs, installation difficulties, and inadequate distribution of fluid. An inexpensive, easily-mounted, effective washer jet was not available until the present invention was made.

SUMMARY OF THE INVENTION

The present invention provides an arm-mounted windshield washer jet assembly which is easy to mount, inexpensive to manufacture and easy to maintain, and which delivers adequate fluid to the entire windshield without any difficulty for effective cleaning thereof.

One of the primary objects of the invention is to provide a washer jet assembly which is more effective, less expensive to manufacture, easier to mount on new or old wiper arms, and requires less maintenance than prior washer jets.

The other primary object of the invention is to provide an improved method of sealing a washer jet assembly by using a cover button which secures itself to the washer jet housing.

Another object of the invention is to reduce the number of parts that make up the washer jet assembly to a simple housing, having a distribution cavity and jet grooves, and a cover button which covers said distributing cavity and jet outlet grooves to form a distribution chamber and jet outlet passageways.

Another object of the invention is to reduce the time of manufacture of washer jet assemblies by reducing the number of steps required to construct the assemblies.

Another object of the invention is to provide a washer jet assembly in which all components can be readily molded from plastic.

Another object of the invention is to provide a washer jet assembly which wets the entire windshield surface effectively by projecting streams (not sprays) of fluid with sufficient pressure from a limited number of jet outlets, which are of such size to limit clogging by foreign substances.

Another object of the invention is to provide jet outlets which direct fluid to one side of the wiper but at differing points on the windshield to avoid ineffectiveness of the wiper caused by the overlapping of the projected fluid in some areas and the lack of proper wetting in other areas.

Other objects, features and advantages of the invention will be made apparent in the following detailed description, taken together with the drawings, where like parts are identified by the same reference numerals, in which:

DESCRIPTION OF THE PREFERRED EMBODIMENT

Figure 1:
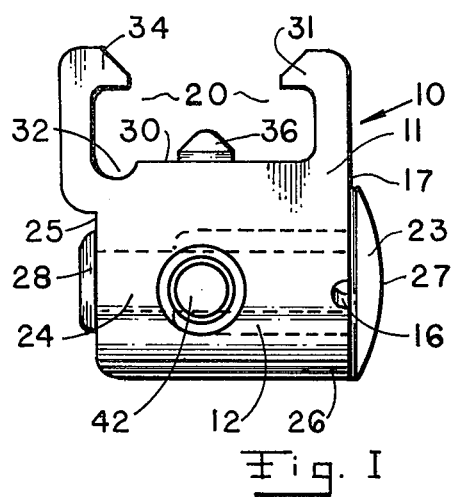
FIG. 1 is a side elevation of a preferred embodiment of the washer jet assembly.
Figure 2:
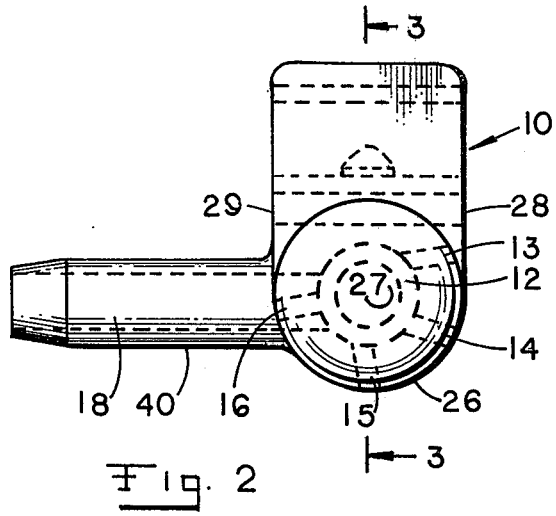
FIG. 2 is a bottom elevation of a preferred embodiment of the washer jet assembly.
Figure 4:
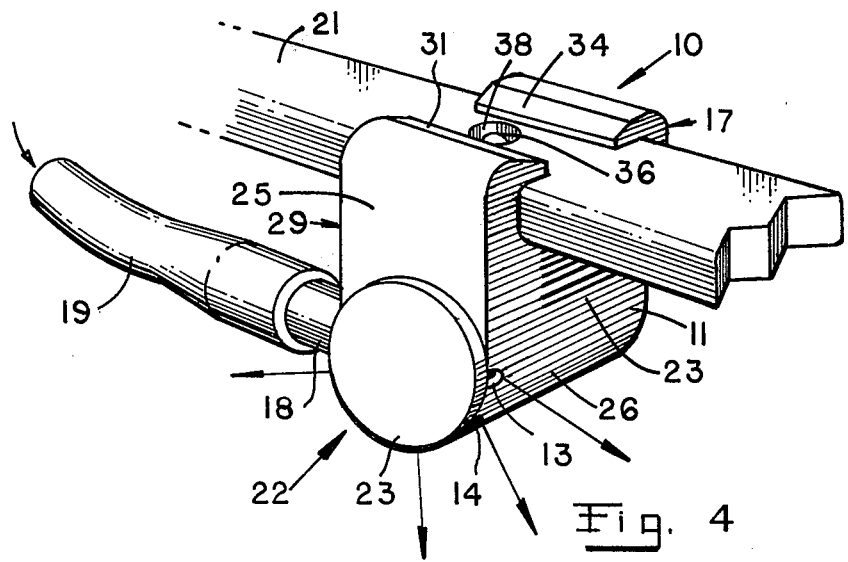
FIG. 4 is a perspective view of the washer jet assembly attached to a portion of a typical wiper arm looking toward the heel of the wiper arm.

Referring to FIGS. 1, 2 and 4, the washer jet assembly 10 is shown as including (1) a housing 11 with cylindrical distribution cavity 12, four jet outlet grooves 13, 14, 15 and 16 formed in end wall 17, inlet sleeve 18 for connection with hose 19, and a groove 20 for affixing the washer jet assembly 10 to a wiper arm 21, and (b) a cover button 22 with head portion 23 and shank portion 24 which closes the open faces of distribution cavity 12 and jet outlet grooves 13, 14, 15 and 16 and which is secured to housing 11 by upsetting the shank portion 24 of the cover button 22 on the outside surface of end wall 25.

Housing 11, which contains distribution cavity 12 and jet outlet grooves 13, 14, 15 and 16, is composed of a semicylindrical sidewall 26 which extends to a central axis 27 on two opposing sides and which continues as parallel flat sidewalls 28 and 29 which are met by a flat top wall 30 at right angles thereto, thereby encircling the distribution cavity 12. Sidewalls 26, 28 and 29 also meet end wall 25 and end wall 17 at right angles.

The end wall 17 extends beyond top wall 30 and meets holding edge 31 at a right angle. The end wall 25 also extends beyond top wall 30, but is positioned outwardly of housing 11 prior to meeting top wall 30 to allow the placement of groove 32 at the junction of end wall 25 and top wall 30. End wall 25 extends therefrom and meets holding edge 34 which is located directly across from holding edge 31. As a result, a groove 20, to hold wiper arm 21, is formed by end wall 25, end wall 17, top wall 30, groove 32 and holding edges 31 and 34. Placement of the washer jet assembly 10 on the wiper arm 21 is facilitated by the flex of end wall 25 at the line of groove 32. End wall 25 can be forced out away from end wall 17, the wiper arm 21 can then be inserted, and end wall 25 will return to its original position. End wall 25, end wall 17 and holding edges 31 and 34 prevent the washer jet assembly 10 from disengaging from the wiper arm 21 by nearly enclosing said wiper arm 21. Further, protuberance 36 centered in groove 20 on top wall 30 prevents displacement of the washer jet assembly 10 along wiper arm 21 when it is inserted into hole 38 appropriately placed on wiper arm 21.

Inlet sleeve 18 is comprised of elongate cylindrical wall 40 which extends radially outward from center axis 17. Wall 40 joins with sidewall 29 at a right angle. An inner passageway 42 lies within wall 40 and extends beyond sidewall 29 and opens into distribution cavity 12. Inlet sleeve 18 is inserted into a resilient flexible hose 19 to establish fluid communication between distribution cavity 12 and a fluid source (not shown).

As seen in FIG. 1, the inlet sleeve 18 is located at the top end of distribution cavity 12 so that the fluid delivered to the jet outlet grooves 13, 14, 15 and 16 does not vary among the grooves because of the injection of new fluid into the distribution cavity 12.

As best seen in FIG. 2, the jet outlet grooves 13, 14, 15 and 16 extend nearly radially outward from central axis 27 and are nearly equally spaced on the circular edge of distribution cavity 12 to equalize the pressures at the opening of each jet outlet groove. Since the washer jet assembly 10 is intended to be located nearer the heel of the wiper arm 21 than the tip, and since the fluid tends to drain down the windshield, jet outlet grooves 13, 14 and 15 are directed toward the tip and only jet outlet groove 16 is directed toward the heel. Thus, fluid is projected over the entire length of the wiper. Jet outlet groove 13 is directed toward the tip of wiper arm 21 and upward from the central axis 27 at a preferred direction angle of 15° from horizontal. Jet outlet grooves 14 and 15 are directed toward the tip of wiper arm 21 and downward from the central axis 27 at preferred direction angles of 15° and 80°, respectively, from horizontal. Jet outlet groove 16 is directed toward the heel of wiper arm 21 and downward from the central axis 27 at a preferred direction angle of 10° from horizontal. The preferred direction of the jet outlet grooves would vary, of course, depending on the intended placement of the washer jet assembly on wiper arm 21.

Figure 3:
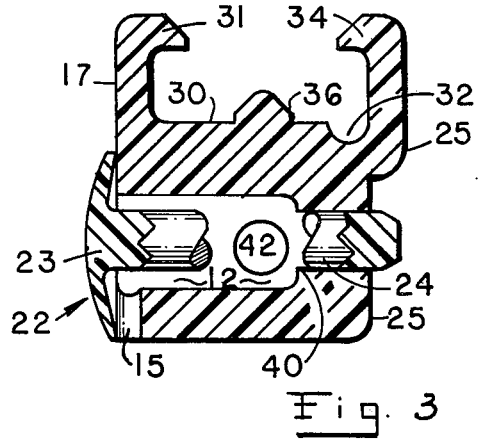
FIG. 3 is a view of a cross section taken substantially along line 3—3 of FIG. 2 and looking in the direction of the arrows, showing the washer jet housing, with the inlet distribution chamber and an outlet jet passageway, and the cover button prior to upsetting of the shank portion.
Figure 3A:
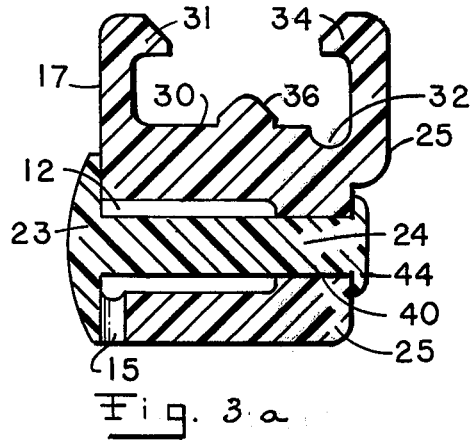
FIG. 3a is a view of a cross section taken substantially along line 3—3 of FIG. 2 and looking in the direction of the arrows, showing features shown in FIG. 3, but after the shank portion of the cover button is upset.

From FIGS. 3 and 3a, it is seen that the cover button 22 performs three functions. It closes the distribution cavity 12 to form a distribution chamber, closes the jet outlet grooves 13, 14, 15 and 16 to form jet outlet passageways, and secures itself to the housing 11. The cover button consists of cylindrical shank portion 24 and head portion 23 which has a slightly concave inner surface on the shank side. The shank 24, which is of lesser diameter than distribution cavity 12, extends from its attachment to head 23 through the distribution cavity 12 and through a cylindrical wall or opening 40, which extends from the top of distribution cavity 12 through the outside surface of end wall 25 of body or housing 11. The shank 24 is then upset to form a flange 44 so as to secure the cover button and prevent it from becoming unseated as the seal of distribution cavity 12 and jet outlet grooves 13, 14, 15 and 16. Cylindrical wall or opening 40 is slightly smaller than the shank diameter so as to create a press fit when shank 24 is inserted into cylindrical wall or opening 40. Cylindrical wall or opening 40 is sealed due to the press fit and the upset of shank 24. The distribution cavity 12 is sealed due to the tension at the outer periphery of the inner concave surface of head 23 of the cover button 22 which is pressed against end wall 17.

In operation, the washer jet assembly 10 is attached to wiper arm 21 near its heel, and inlet sleeve 18 is connected to hose 19 supplying fluid which is then pumped into distribution chamber 12 where it circulates around shank 24 of the cover button 22 and is eventually forced through and out of jet outlets 13, 14, 15 and 16. The fluid is thus delivered to the surface of the windshield toward the wiper on one side thereof.

We claim:

1. A method for sealing a washer jet assembly having a housing with a distribution cavity and a reduced diameter opening aligned with said distribution cavity, a cover button having an integrally formed head portion and shank portion with the end of the shank portion remote from the head portion being inserted through the distribution cavity and forced through said reduced diameter opening, said head portion having a concave-shaped surface on the shank side thereof with said concave-shaped surface being seated against an open end of said distribution cavity, said head portion being pressed against said housing to flatten said concave shape to a flat shape, and the remote end of said shank portion being upset to form a flange to secure said cover button flat against said housing.

2. A washer jet assembly comprising a washer jet housing, having a distribution cavity, an inlet passageway sleeve receiving a hose and extending from without the wall of said washer jet housing to said distribution cavity, jet outlet grooves formed in one lateral edge of said housing and extending from said distribution cavity to the bottom surface of said washer jet housing, an attaching means integrally formed on said housing for securing said washer jet assembly to a wiper arm, said attaching means comprising a pair of inwardly facing overhanging members for engaging over opposite side edges of said wiper arm, a protuberance formed on said housing between said overhanging members, said protuberance engaging said wiper arm for positioning said jet assembly along the length of said arm, and a cover button means having an integrally formed head portion and shank portion, said head portion being seated against said housing to close said distribution cavity and to define one wall of said jet outlet grooves to respectively form therewith a distribution chamber and jet outlet passageways, and said shank portion having a diameter smaller than said distribution chamber but larger than an opening in a wall of said distribution chamber, and said shank portion extending through said distribution chamber and through said opening, and a flange being formed on the end of said shank portion for securing said cover button to said housing.

3. The washer jet assembly as claimed in claim 2 wherein said jet outlet passageways are four in number with at least two of said passageways directed generally forward, away from the direction of the inlet sleeve and one of said passageways directed generally rearward in the direction of said inlet sleeve.

* * * * *